(12) United States Patent
Wrobel

(10) Patent No.: US 6,171,033 B1
(45) Date of Patent: Jan. 9, 2001

(54) HAND DRILL EXTENDER KIT

(76) Inventor: Robert B. Wrobel, 5627 N. Fairview, Norwood Park, IL (US) 60631

(*) Notice: Under 35 U.S.C. 154(b), the term of this patent shall be extended for 0 days.

(21) Appl. No.: 09/306,943

(22) Filed: May 7, 1999

(51) Int. Cl.[7] .................................................. B23B 45/00
(52) U.S. Cl. ................ 408/239 R; 279/145; 408/115 R; 408/226
(58) Field of Search ..................... 408/97, 115 R, 408/127, 226, 238, 239 R, 239 A, 231; 279/143, 145

(56) References Cited

U.S. PATENT DOCUMENTS

| | | |
|---|---|---|
| 1,414,110 | 4/1922 | Bocchio . |
| 2,721,592 * | 10/1955 | Baker .................................. 408/206 |
| 3,011,369 * | 12/1961 | Russell .............................. 408/239 R |
| 3,138,183 * | 6/1964 | Stewart ................................. 408/231 |
| 3,865,502 | 2/1975 | Hamann . |
| 4,474,513 | 10/1984 | Salyers . |
| 5,624,214 | 4/1997 | Carroll . |

* cited by examiner

Primary Examiner—Daniel W. Howell
(74) Attorney, Agent, or Firm—Don Moyer

(57) ABSTRACT

A hand drill extender kit has components which are used with a length of electrical conduit to make an extender, a near end of which can be held in the chuck of a hand drill and a far end of which can hold a tool such as a hole saw, the components comprising a chuckable part, a tool holder part, a coupler for coupling two lengths of the electrical conduit, a jig to drill holes diametrically through the electrical conduit for fastening the electrical conduit to the other components, an auxiliary tool holder for tools with larger shafts, and a sample length of electrical conduit with the holes pre-drilled.

11 Claims, 1 Drawing Sheet

HAND DRILL EXTENDER KIT

BACKGROUND OF THE INVENTION

The invention is a kit having parts for making an extender for a hand drill to the length needed at a work site, where electrical conduit, readily available at the work site, is used to make the extender.

It frequently occurs at work sites that an extender is needed so that a hand drill can be used to make a hole at a considerable distance from where the hand drill can be easily used. This occurs, for example, when holes for electrical conduit need to be drilled between studs in finished walls from a basement through to a near floor and through to a far floor. Even if the length of the extender needed could be predicted, it would be inconvenient to carry a pre-made extender from work site to work site.

This problem has been long recognized and prior art shows that a solution has been long sought. People seeking a solution however have focused on schemes for devising variable length extenders. Examples are shown by Bocchio in U.S. Pat. No. 1,414,110; by Hamann in U.S. Pat. No. 3,865,502; by Salyers in U.S. Pat. No. 4,474,513, and by Carroll in U.S. Pat. No. 5,624,214.

Variable length extenders can not work very well because of the number of movable joints which must be included, and they are still inconvenient to carry from site to site. Making a variable length extender smaller so that it is less inconvenient to carry about introduces more movable joints and thus makes the extender less reliable and less safe to use. There remains a need for an extender which has reliable and safe joints and which can be used easily.

The invention shown here is based on a discovery of a new solution to this old problem. The new solution is to provide a kit which comprises parts which can be used with electrical conduit, readily available at work sites, to easily make an extender having the length needed at the particular site. This extender has secure joints so that it can be used reliably and safely. It can be disassembled after use, and only the parts comprising the kit need be carried from site to site.

This solution is not suggested in any prior art nor by any combinations of prior art.

SUMMARY OF THE INVENTION

Objects of this invention comprise requirements listed in the following imperatives. Make a hand drill extender kit which has a chuckable part which can be secured in a hand drill chuck and which can be secured in a near end of a length of electrical conduit. Provide in the kit a tool holder part into which a tool can be secured and which can be secured in a far end of the electrical conduit. Secure the chuckable part and the tool holder part in the electrical conduit ends by means of fasteners passing diametrically through the electrical conduit.

Other objects of alternative forms of the invention comprise requirements listed in the following imperatives. Provide in the kit a jig for drilling a holes along a diameter of the conduit at the conduit near end and along a diameter of the conduit at the conduit far end so that the holes match holes through the chuckable part and through the tool holder part and so that fasteners through these holes secure the chuckable part and the tool holder part in the conduit ends. Provide in the kit a coupler which can secure two components of the length of electrical conduit. Provide in the kit an auxiliary tool holder part which can hold tools with larger diameter chuckable shafts. Include in the kit a sample length of conduit with the holes pre-drilled.

Other objects will be comprehended in the drawings and detailed description, which will make additional objects obvious hereafter to persons skilled in the art.

In summary one embodiment of this invention is a kit comprising a chuckable part which can be secured in the chuck of a hand drill and which can be secured in a near end of a length of electrical conduit; and has a tool holder part into which a tool can be secured, and which can be secured in a far end of the length of conduit.

Other equivalent embodiments will be comprehended in the drawings and detailed description, which will make additional equivalent embodiments obvious hereafter to persons skilled in the art.

DESCRIPTION OF THE PREFERRED EMBODIMENTS

Figure 1:
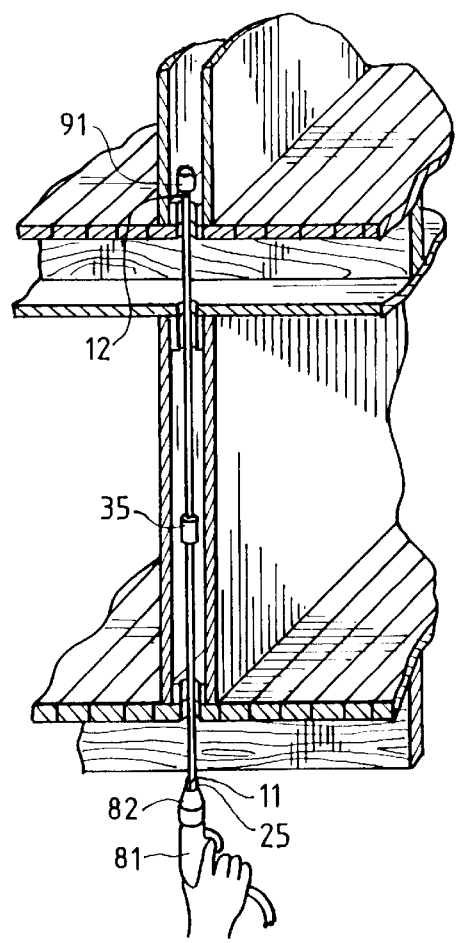
FIG. 1 shows a drill holder made with the extender kit in use.

The hand drill extender kit, which is used in combination with a hand drill and with electrical conduit, is used to construct an extender for the hand drill using a length of the electrical conduit. The electrical conduit is cut to the needed length. The kit provides a chuckable part 20 which is secured into a near end 11 of the length of electrical conduit and provides a tool holder part 40 which is secured in a far end 12 of the electrical conduit. A tool 91, such as a hole saw, is secured in the tool holder part and the chuckable part is chucked in the hand drill 81. Now the hand drill can be used to drill a hole at a considerable distance from where the hand drill can be easily used as shown in FIG. 1. The length of electrical conduit can have two components secured together by a coupler 30 so that one long length of electrical conduit need not be manipulated as the tool extender is moved into position such as the position shown in FIG. 1.

Figure 3:
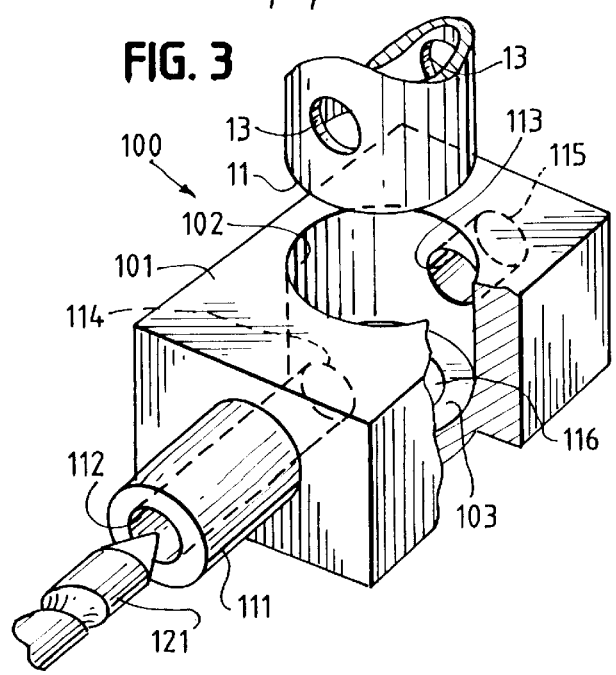
FIG. 3 shows a jig which is included in the kit, and which is used to drill holes along diameters of the conduit.
Figure 2:
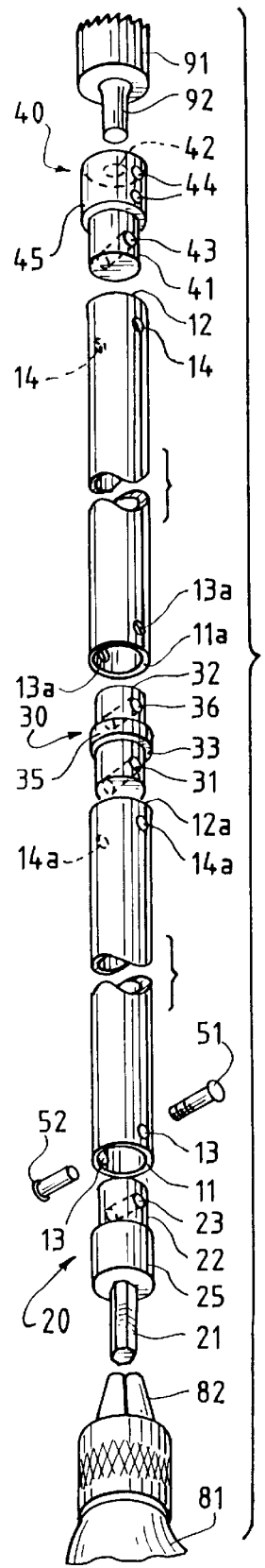
FIG. 2 shows an exploded view of the parts of the kit along with the electrical conduit used to make an extender.

An exploded view of the elements is shown in FIG. 2. The kit comprises a chuckable part 20, a coupler 30, a tool holder part 40, and a jig 100 shown in FIG. 3.

The chuckable part has a chuckable shaft 21 which can be secured in the chuck 82 of a hand drill 81, and has a near shaft 22 which can be secured in a near end 11 of a length of electrical conduit. To secure the near shaft 22 in the near end 11 of the electrical conduit a near hole 23 along a near shaft diameter is aligned with a near end pair of holes 13 along a near end diameter of the electrical conduit, and a fastener 51 and 52 is secured along the aligned holes.

The tool holder part has a far shaft 41 which can be secured in a far end 12 of the length of electrical conduit, and has a tool holder 42. To secure the far shaft 41 in the far end 12 of the electrical conduit a far shaft hole 43 along a far shaft diameter is aligned with a far end pair of holes 14 along a far end diameter of the electrical conduit, and a fastener (not shown), interchangeable with the fastener 51 and 52, is secured along the aligned holes.

A tool 91, such as a hole saw, can be secured in the tool holder 42. In a preferred form the tool shaft 92 is secured in the tool holder 42 by means of set screws 44, but other tool holding devices, such as a far chuck, can be used.

The length of electrical conduit between the near end 11 and the far end 12 can have two, and more, components. A near component would have a near end 11 and a mid-near end 12a, and a far component would have a far end 12 and a mid-far end 11a.

A coupler 30 having a mid-near shaft 31 and a mid-far shaft 32 can be secured in the mid-near end by 12a a fastener (not shown), interchangeable with the fastener 51 and 52, through holes 14a along a mid-near end diameter and aligned with a hole 33 along a mid-near shaft diameter, and secured in the mid-far end 11a by a fastener (not shown), interchangeable with the fastener 51 and 52, through holes 13a along a mid-far end diameter and aligned with a hole 36 along a mid-far shaft diameter.

In the preferred form, the fastener 51 and 52 has a first member 51 with external threads and a second member 52 with internal threads which thread onto the internal threads. Other fasteners known in the art can be used as well. The holes, 13 for example can be threaded and be part of fastener components threaded therein. Fasteners acting along a diameter of the combined shaft and electrical conduit secure the electrical conduit to the shaft reliably. The only problem is to accurately, and safely drill holes along a diameter of the electrical conduit.

This problem is solved by providing a jig 100 in the extender kit. The jig body 101 has an opening 102 into which an electrical conduit end, the near end 11 for example, can be positioned. There is a stop 103 which insures that the holes, the holes 13 for example, will be aligned accurately along the electrical conduit end. A bushing 111 guides a drill 121 through a guide path 112 to 114 into the opening 102 and along a diameter of the electrical conduit through to an outlet path 113 which exits the jig body at 115. Debris from drilling can fall out through an opening 116.

All of the shaft holes—23, 33, 36, and 43—through all of the shafts—respectively the near shaft 22, the mid-near shaft 31, the mid-far shaft 32, and the far shaft 41—align with holes in electrical conduit made using the jig 100. The jig can have many forms so long as it aligns the holes along a diameter of the electrical conduit and positions the holes along the long axis of the conduit.

Each of the parts 20, 30, and 40 has a shoulder portion—25, 35, and 45 respectively—which has a diameter larger than the shafts—22, 31, 32, and 42 respectively—which fit inside the electrical conduit. These shoulder portions help align the respective holes—23, 33, 36, and 43—with the conduit holes—13, 14a, 11a, and 14 respectively—in order to ease assembly of an extender. The jig stop 103 aligns the holes drilled with the jig to match the alignment provided by the shoulder portions.

In one form of the kit an auxiliary tool holder (not shown) is provided. The auxiliary tool holder is interchangeable with the tool holder 40 but can hold a larger diameter tool. In another form of the kit a sample length of electrical conduit (not shown) is included. This sample length of electrical conduit has holes interchangeable with holes 13 and 14 predrilled so that a user can see how the pieces 20, 30, and 40 fit onto a length of electrical conduit.

Other equivalent forms for the chuckable part, the tool holder part, the coupler, the jig, and the auxiliary tool holder part and other equivalent fasteners which can connect these parts to lengths of electrical conduit will be obvious hereafter to persons skilled in the art. Therefore this invention is not limited to the particular examples shown and described here.

I claim:

1. In combination with a hand drill, the hand drill having a chuck, and a length of electrical conduit, a hand drill extender kit comprising:

a chuckable part, the chuckable part having a chuckable shaft which can be secured in the chuck, and the chuckable part having a near shaft which can be secured in a near end of the length of electrical conduit by a near fastener extending diametrically through the near end of the length of electrical conduit and through the near shaft; and a tool holder part, the tool holder part having a far shaft which can be secured in a far end of the length of electrical conduit by a far fastener extending diametrically through the far end of the length of electrical conduit and through the far shaft, and the tool holder part having a tool holder into which a tool can be secured.

2. The device of claim 1 further comprising a jig, the jig having an opening into which the near end of the length of electrical conduit can be placed, the jig having a bushing which guides a drill to drill near end holes diametrically through the length of electrical conduit which is placed in the opening, the near end holes being aligned along the length of electrical conduit in order to align with a near shaft hole diametrically through the near shaft.

3. The device of claim 2 further comprising a coupler comprising:

a mid-near end which can be secured in a mid-near end of a first component of the length of electrical conduit by a mid-near fastener extending diametrically through the mid-near end of the first component of the length of electrical conduit and diametrically through the mid-near shaft; and a mid-far shaft which can be secured in a mid-far end of a second component of the length of electrical conduit by a mid-far fastener extending diametrically through the mid-far end of the second component of the length of electrical conduit and diametrically through the mid-far shaft.

4. The device of claim 3 further comprising an auxiliary tool holder part, the auxiliary tool holder part having an auxiliary far shaft which can be secured in the far end of the length of electrical conduit by the far fastener extending diametrically through the far end of the length of electrical conduit and diametrically through the auxiliary far shaft, and the auxiliary tool holder part having a tool holder into which a large shaft tool can be secured.

5. The device of claim 4 further comprising a sample length of electrical conduit, the sample length of electrical conduit having a sample length of electrical conduit near end which is prepared to be secured on the near shaft by the near fastener extending diametrically through the sample length of electrical conduit near end and diametrically through the near shaft, and the sample length of electrical conduit having a sample length of electrical conduit far end which is prepared to be secured on the far shaft by the far end fastener extending diametrically through sample length of electrical conduit far end and diametrically through the far shaft.

6. In combination with a hand drill, the hand drill having a chuck, and a length of electrical conduit, a hand drill extender kit comprising:

a chuckable part, the chuckable part having a chuckable shaft which can be secured in the chuck, and the chuckable part having a near shaft which can be secured in a near end of the length of electrical conduit by a near fastener extending diametrically through the near end of the length of electrical conduit and through the near shaft;

a tool holder part, the tool holder part having a far shaft which can be secured in a far end of the length of electrical conduit by a far fastener extending diametrically through the far end of the length of electrical conduit and through the far shaft, and the tool holder part having a tool holder into which a tool can be secured: and a jig, the jig having an opening into which the near end of the length of electrical conduit can be placed, the jig having a bushing which guides a drill to drill near end holes diametrically through the length of electrical conduit which is placed in the opening, the near end holes being aligned along the length of electrical conduit in order to align with a near shaft hole diametrically through the near shaft.

7. The device of claim 6 further comprising an auxiliary tool holder part, the auxiliary tool holder part having an auxiliary far shaft which can be secured in the far end of the length of electrical conduit by the far fastener extending diametrically through the far end of the length of electrical conduit and diametrically through the auxiliary far shaft, and the auxiliary tool holder part having a tool holder into which a large shaft tool can be secured.

8. The device of claim 7 further comprising a sample length of electrical conduit, the sample length of electrical conduit having a sample length of electrical conduit near end which is prepared to be secured on the near shaft by the near fastener extending diametrically through the sample length of electrical conduit near end and diametrically through the near shaft, and the sample length of electrical conduit having a sample length of electrical conduit far end which is prepared to be secured on the far shaft by the far end fastener extending diametrically through sample length of electrical conduit far end and diametrically through the far shaft.

9. In combination with a hand drill, the hand drill having a chuck, and a length of electrical conduit, a hand drill extender kit comprising:

a chuckable part, the chuckable part having a chuckable shaft which can be secured in the chuck, and the chuckable part having a near shaft which can be secured in a near end of the length of electrical conduit by a near fastener extending diametrically through the near end of the length of electrical conduit and through the near shaft;

a tool holder part, the tool holder part having a far shaft which can be secured in a far end of the length of electrical conduit by a far fastener extending diametrically through the far end of the length of electrical conduit and through the far shaft, and the tool holder part having a tool holder into which a tool can be secured;

a jig, the jig having an opening into which the near end of the length of electrical conduit can be placed, the jig having a bushing which guides a drill to drill near end holes diametrically through the length of electrical conduit which is placed in the opening, the near end holes being aligned along the length of electrical conduit in order to align with a near shaft hole diametrically through the near shaft; and a coupler comprising:

a mid-near end which can be secured in a mid-near end of a first component of the length of electrical conduit by a mid-near fastener extending diametrically through the mid-near end of the first component of the length of electrical conduit and diametrically through the mid-near shaft; and a mid-far shaft which can be secured in a mid-far end of a second component of the length of electrical conduit by a mid-far fastener extending diametrically through the mid-far end of the second component of the length of electrical conduit and diametrically through the mid-far shaft.

10. The device of claim 9 further comprising an auxiliary tool holder part, the auxiliary tool holder part having an auxiliary far shaft which can be secured in the far end of the length of electrical conduit by the far fastener extending diametrically through the far end of the length of electrical conduit and diametrically through the auxiliary farl shaft, and the auxiliary tool holder part having a tool holder into which a large shaft tool can be secured.

11. The device of claim 10 further comprising a sample length of electrical conduit, the sample length of electrical conduit having a sample length of electrical conduit near end which is prepared to be secured on the near shaft by the near fastener extending diametrically through the sample length of electrical conduit near end and diametrically through the near shaft, and the sample length of electrical conduit having a sample length of electrical conduit far end which is prepared to be secured on the far shaft by the far end fastener extending diametrically through sample length of electrical conduit far end and diametrically through the far shaft.

* * * * *